US005972129A

United States Patent [19]
Beguinot et al.

[11] Patent Number: 5,972,129
[45] Date of Patent: Oct. 26, 1999

[54] PROCESS FOR SMELTING A TITANIUM STEEL AND STEEL OBTAINED

[75] Inventors: Jean Beguinot; Jean-Luc Beau; Marie-Luce Nectoux, all of Le Creusot, France

[73] Assignee: Creusot Loire Industrie, Puteaux, France

[21] Appl. No.: 08/564,931

[22] Filed: Nov. 30, 1995

[30] Foreign Application Priority Data

Nov. 30, 1994 [FR] France .................................. 94 14346

[51] Int. Cl.⁶ .............................. C22C 1/02; C22C 38/14
[52] U.S. Cl. ......................... 148/328; 148/560; 148/567; 148/568
[58] Field of Search .............................. 148/328; 75/560, 75/567, 568

[56] References Cited

U.S. PATENT DOCUMENTS 5,089,068  2/1992  Okada et al. ........................... 148/328

FOREIGN PATENT DOCUMENTS 0 177 851  4/1986  European Pat. Off. .
0 337 114  10/1989  European Pat. Off. .
0 589 424  3/1994  European Pat. Off. .

OTHER PUBLICATIONS

M. Y. Balabanov, Database WPI Section Ch, Week 9404 Derwent Publications Ltd., London, GB; Class M27, AN 94–033187 & SU–A–1 786 109 (Ferrous Metallurgy Inst), Jan. 7, 1993 *abriged*.

V. P. Kirilenko, Features of Production of Converter Steel Economically Alloyed with Titanium; Steel In Translation, vol. 22, No. 5, London, GB, May 1992, pp. 216–217.

Primary Examiner—Deborah Yee
Attorney, Agent, or Firm—Oblon, Spivak, McClelland, Maier & Neustadt, P.C.

[57] ABSTRACT

Process for smelting a titanium steel according to which a liquid steel containing more than 0.003% of nitrogen and not containing titanium is smelted and then more than 0.005% of titanium is introduced into the liquid steel by progressive diffusion from an oxidized phase containing titanium and the steel is solidified. Steel obtained by the process.

28 Claims, 2 Drawing Sheets

PROCESS FOR SMELTING A TITANIUM STEEL AND STEEL OBTAINED

FIELD OF THE INVENTION

The present invention relates to a process for smelting titanium-containing steel and to the product produced.

DISCUSSION OF THE BACKGROUND

The addition of titanium to steel in general, and to low-alloy steels in particular, is a well-known means for controlling the high temperature austenitic grain, for example in the heat-affected zones during welding, and, where appropriate, to harden the structure obtained after heat or thermomechanical treatment. In order to manufacture these steels, liquid steel free of titanium is smelted, the liquid steel is vigorously deoxidized, for example by the addition of aluminum, and then blocks of ferro-titanium are added which progressively dissolve.

While the ferro-titanium blocks are dissolving, the titanium reacts with the nitrogen present in the steel and forms relatively coarse precipitates having a size on the order of 1 $\mu$m or more. It is these precipitates which, after the steel has solidified, prevent austenitic grain growth. However, these precipitates have several drawbacks because they are sharp-angled, relatively coarse and consequently relatively few in number; their effect on the hardening and refining of the microstructure is limited and they degrade the fracture toughness of the steel.

It has been proposed, especially in EP 0,177,851, to manufacture low alloy titanium steels, having a very low aluminum content, in which the titanium is in the form of oxides. These oxides act as preferred sites for nucleation of ferrite during transformations from austenite to ferrite/pearlite; they thus result in a refinement of the ferrito-pearlistic structures, which improves the toughness, especially of welded joints, very considerably. However, this technique has several drawbacks: it requires a very low aluminum content, which is prejudicial to controlling the austenitic grain during heat treatments and requires a very short casting time and a very short solidification time, which complicates manufacture, and it only has an effect on the ferrito-pearlistic structures.

OBJECTS OF THE INVENTION

One object of the present invention is to remedy these prior art drawbacks by providing a process for the manufacture of titanium-containing steel containing neither titanium oxides nor coarse nitrides formed in the liquid steel.

Another object of the present invention is to provide titanium-containing steels and various structures made therefrom, including castings, etc.

BRIEF DESCRIPTION OF THE DRAWINGS

The invention is partially described in the appended figures, in which.

DETAILED DESCRIPTION OF THE INVENTION

Figure 1:
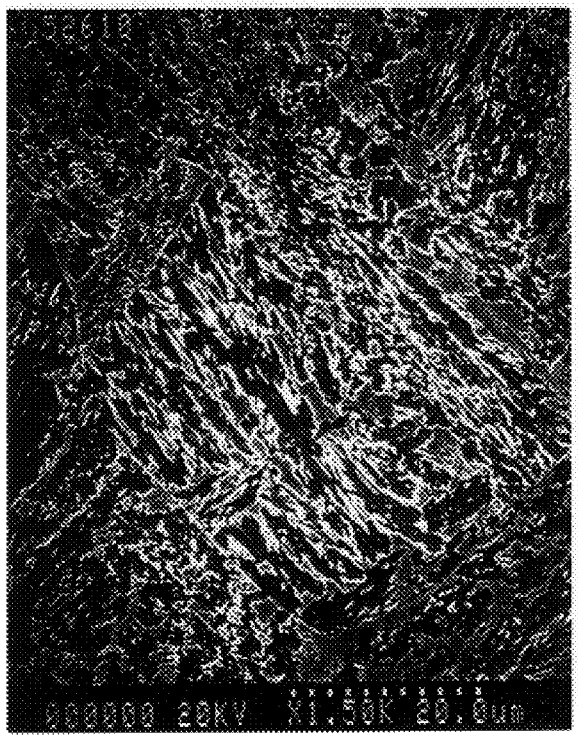
FIG. 1 is an electron micrograph at a magnification of 1500 of a titanium steel according to the prior art and having a bainitic structure.

The first object of the invention is provided by a process for smelting titanium steel (i.e., titanium-containing steel) comprising the steps of:

smelting a liquid steel containing more than 0.003% of nitrogen and not containing titanium;

introducing more than 0.005% of titanium into the liquid steel by progressive diffusion from an oxidized phase containing titanium;

optionally adding various desired alloying elements; and solidifying the steel, where "%" hereabove and everywhere herein means percent by weight.

In order to introduce titanium by progressive diffusion from an oxidized phase containing titanium, it is possible, for example, to bring the non-deoxidized liquid steel into contact with an oxidized phase containing titanium, and then to deoxidize the liquid steel by the addition of at least one element which is more reducing than titanium and optionally to renew the contact surface between the liquid steel and the oxidized phase containing titanium. It is also possible to add titanium to the non-deoxidized liquid steel and then to add at least one element more reducing than titanium to the liquid steel. Before adding titanium to the non-deoxidized liquid steel, the liquid steel may be covered with a slag. When the steel contains little nitrogen, after progressively introducing the titanium into the steel, the nitrogen content of the steel may be increased by agitating with gaseous nitrogen or with a mixture of an inert gas such as argon with nitrogen.

By "deoxidize" it is meant that one or more strong reducing elements such as aluminum or zirconium, etc. is added to the liquid steel in sufficient amount to reduce the activity of dissolved oxygen in the liquid steel to a level such that no reaction between oxygen and elements other than the strong reducing element(s) is possible in the steel. Typically, deoxidized steel contains less than or equal to 0.0001% dissolved oxygen. Non-deoxidized steel is characterized in that is obtained after smelting and, optionally, bubbling $O_2$: i.e., raw steel containing, e.g., 0.001–0.005% oxygen or more. Examples of elements more reducing than titanium include aluminum, zirconium, calcium, etc.

The oxidized phase containing titanium may be, for example, a slag or a cover powder and may typically contain 10% $SiO_2$, 12% $Al_2O_3$, 58% CaO, 9% MgO, 10% $TiO_2$ and optionally $CaF_2$. In order to renew the contact surface between the liquid steel and the oxidized phase containing titanium, it is possible to agitate the liquid steel, etc.

The invention also relates to, and the second object described above is provided by, steel, preferably obtained by the process according to the invention, which contains, by weight, more than 0.005% of titanium and more than 0.003% of nitrogen, the titanium and nitrogen contents being such that:

$(N\%)\times(Ti\%) \leq 0.0016$ and this steel preferably being such that, in the solid state, the number of titanium nitride precipitates having a size greater than 0.1 µm, measured over an area of 1 mm², is less than 4 times the total content of titanium precipitated in the form of nitrides, expressed in thousandths of % by weight, preferably less than 3 times.

Preferably, the invention steel contains more than 0.01% of at least one element selected from aluminum and zirconium, but less than 0.5% of aluminum and less than 0.5% of zirconium.

Preferably, the chemical composition, by weight, of the steel satisfies the relationships:

$0.003\% \leq N \leq 0.02\%$ $0.010\% \leq Ti \leq 0.1\%$ $(N\%)\times(Ti\%) \leq 0.0016$ The invention relates especially to a steel whose chemical composition, by weight, comprises:

$0.04\% \leq C \leq 0.80\%$ $0\% \leq Si \leq 2\%$ $0\% \leq Mn \leq 3\%$ $0\% \leq Ni \leq 10\%$ $0\% \leq Cr \leq 10\%$ $0\% \leq Mo \leq 3\%$ $0\% \leq Cu \leq 2\%$ $0\% \leq V \leq 1\%$ $0\% \leq Nb \leq 0.5\%$ $0\% \leq W \leq 3\%$ $0\% \leq S \leq 0.2\%$ $P \leq 0.03\%$ and iron, optionally including at least one element taken from: Ca, Mg, Se, Te, Bi and B in amounts less than 0.1%. The balance of the steel is preferably iron and any impurities resulting from smelting. Ferrometallurgical components and products made of steel according to the invention, the structure of which contains at least 30% of bainite, are particularly preferred.

In more detail, the invention relates to steel in general and, more particularly, to low alloy steels whose chemical composition, by weight, principally comprises:

carbon, between 0.04% and 0.8%;

between 0% and 2% of silicon, between 0.1% and 3% of manganese, from 0% to 10% of nickel, from 0% to 10% of chromium, from 0% to 3 k of molybdenum, from 0% to 2% of copper, from 0% to 1% of vanadium and from 0% to 0.5% of niobium;

more than 0.003% nitrogen and preferably between 0.005% and 0.02%;

more than 0.005% titanium and preferably between 0.010% and 0.1%;

at least one deoxidizing element more reducing than titanium; such as aluminum, zirconium, calcium, magnesium, cerium, lithium, thorium, beryllium.

The balance preferably consists of iron and impurities resulting from smelting.

All of these elements of the chemical composition, with the exception of titanium, having universally known effects on the properties of steel, whether its hardenability or mechanical properties. The chemical compositions of the invention include all steels capable of having a structure which is at least partially bainitic and for which it is desirable for the fracture toughness to be high.

The inventors have completely unexpectedly discovered that, when titanium is added to steel using the process referred to and described above and which will be further described later by way of example, the properties of the bainitic structures are very significantly modified. In particular, the inventors have observed that titanium introduced in this way refines the bainitic structure, that is to say it decreases not only the grain size but also the size of the elements making up the substructure, the sizes of the ferrite needles and the carbides. This refinement of the structure and substructures results in a reduction of at least 30° C., and typically of 60° C., in the ductile/brittle transition temperature.

EXAMPLES AND DISCUSSION

The invention will now be further illustrated by way of non-limiting examples and discussion.

The inventors smelted Steel B according to the invention, having a composition by weight (in $10^{-3}\%$):

| C | Si | Mn | Ni | Cr | Mo | Al | Ti | N$_2$ | S | P |
|---|---|---|---|---|---|---|---|---|---|---|
| 183 | 325 | 1390 | 453 | 1395 | 180 | 19 | 25 | 7.8 | 1 | 8 |

This steel was cast in the form of a slab and hot-rolled in order to manufacture a 20 mm thick sheet. The sheet was austenized at 900° C. and then air-cooled, this treatment giving it a martensito-bainitic hybrid structure composed of approximately 60% of bainite, the tensile strength of which was 1180 MPa.

By way of comparison, the inventors also smelted Steel A according to the prior art having a composition, (by weight in $10^{-3}\%$):

| C | Si | Mn | Ni | Cr | Mo | Al | Ti | N$_2$ | S | P |
|---|---|---|---|---|---|---|---|---|---|---|
| 185 | 319 | 1394 | 451 | 1401 | 170 | 18 | 23 | 7.7 | 1 | 9 |

This steel was cast in the form of a slab and hot-rolled in order to manufacture a 20 mm thick sheet. This sheet was austenized at 900° and then air-cooled, this treatment giving it a martensito-bainitic hybrid structure composed of approximately 60% of bainite, the tensile strength of which was 1170 MPa.

Figure 5:
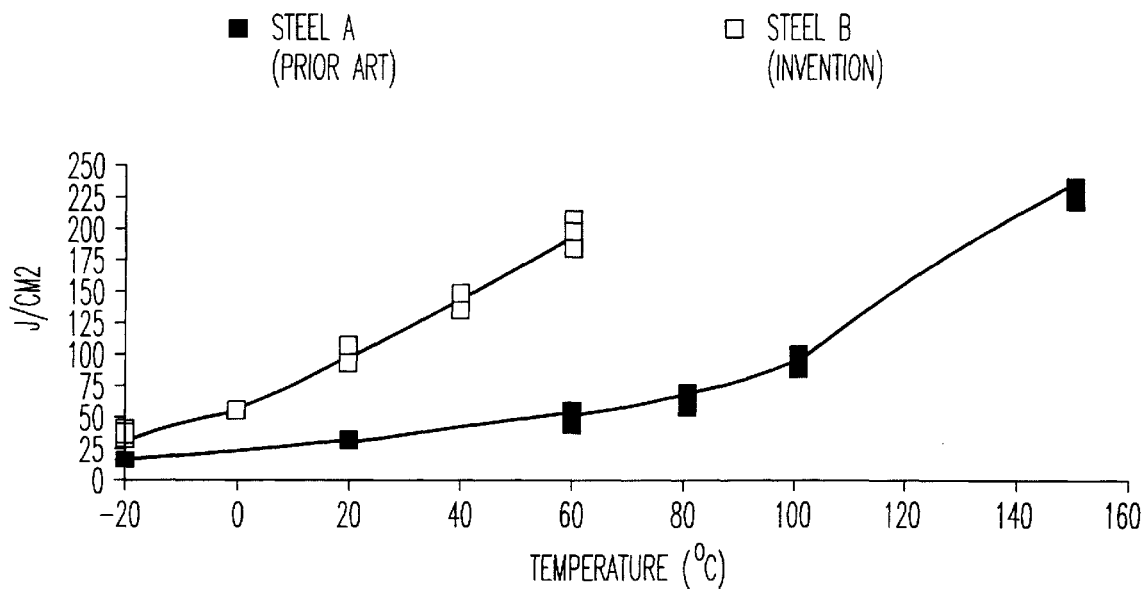
FIG. 5 represents two ductile/brittle transition temperature curves (in terms of fracture energy) corresponding to a steel according to the invention and to a titanium steel according to the prior art.
Figure 6:
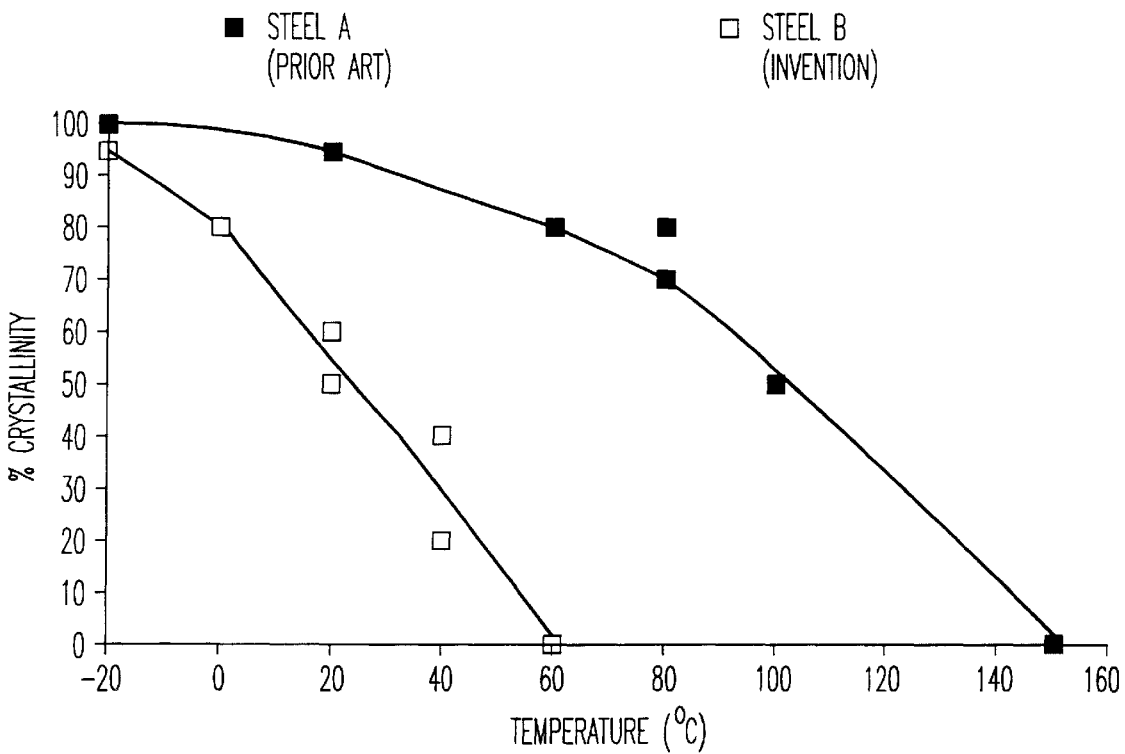
FIG. 6 represents the two fracture toughness curves, in terms of crystallinity, corresponding to the curves in FIG. 5.

The two sheets formed the subject of Kcv fracture toughness tests between 20° C. and 160° C. FIGS. 5 and 6, which represent, for steels A and B, the fracture energies (in J/cm²) and the degrees of crystallinity of the fractures (in %), show that for steel A (according to the prior art) the transition temperature TcA corresponding to a degree of crystallinity of 50% is approximately 100° C., while for steel B according to the invention, the transition temperature TcB is approximately 22° C., i.e., a difference of 78° C. to the advantage of steel B. As a result, the fracture energy at 20° C. of steel B is approximately 100 J/cm² while it is only approximately 30 J/cm² for steel A. At 60° C., the ductile plateau is reached with steel B and the fracture energy is approximately 200 J/cm², while for steel A the fracture is still 80% crystalline and the fracture energy is only 55 J/cm².

A similar result was obtained with the same specimens in the as-hot-rolled state, after reheating the slabs to 1160° C., the rolling being followed by air cooling; the strengths were 1190 MPa for both steels and the ductile/brittle transition temperature was 90° C. for steel A and 30° C. for steel B.

Figure 2:
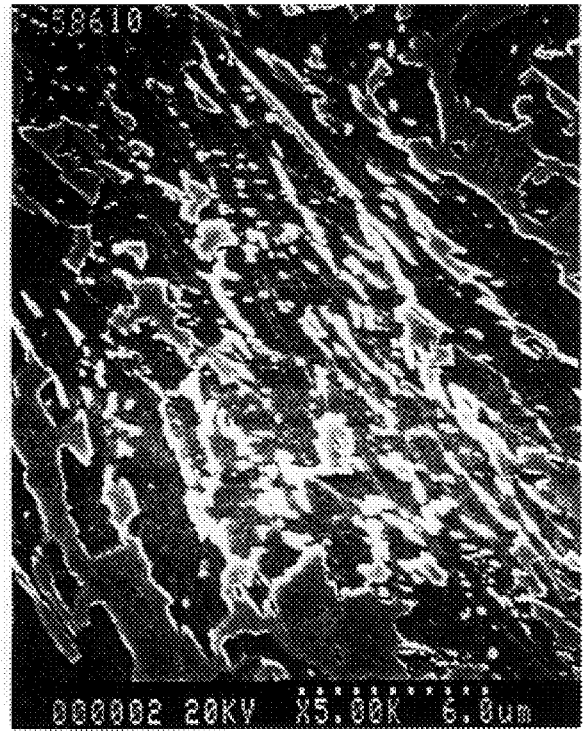
FIG. 2 is an electron micrograph at a magnification of 5000 of a titanium steel according to the prior art and having a bainitic structure.
Figure 3:
FIG. 3 is an electron micrograph at a magnification of 1500 of a steel according to the invention, having a bainitic structure.
Figure 4:
FIG. 4 is an electron micrograph at a magnification of 5000 of a steel according to the invention, having a bainitic structure.

While not being bound by a particular theory, the difference in fracture toughness between the two steels is thought to come from a marked difference in the sizes of the microstructures and substructures, as shown in the micrographs obtained by scanning electron microscopy at magnifications of 1500 and 5000, these being reproduced in FIGS. 1, 2, 3 and 4:

FIG. 1, obtained at a magnification of 1500, on steel A (prior art), shows a grain of bainite of approximately 40 $\mu$m×40 $\mu$m, with its lamellar substructure;

FIG. 2, also obtained at a magnification of 1500, but on steel B, shows grains of bainite of approximately 20 $\mu$m×20 $\mu$m, with their lamellar substructures. The lamellar substructures, which may be seen more clearly at magnification of 5000 (FIGS. 2 and 4), are also much finer in steel B than in steel A, whereas the heat treatments and the chemical compositions are virtually identical.

In steel A, as in steel B, the nitrogen and titanium contents are very similar, and the same applies to the total content of precipitated titanium nitrides. However, measuring titanium nitrides in the form of precipitates having a size greater than 0.1 $\mu$m, using image analysis, shows that the density is 108 particles per mm$^2$ for steel A according to the prior art while it is only 46 particles per mm$^2$ for steel B according to the invention, that is 2.3 times less. Quantitative measurements of precipitated titanium nitrides have shown that the ratio of the number of TiN particles having a size greater than 0.1 $\mu$m per mm$^2$ to the total content of titanium precipitated in the form of nitrides, expressed in thousandths of %, was 5.1 for steel A and only 2.1 for steel B.

It is know that coarse nitrides are obtained by precipitation in liquid steel whereas the titanium nitrides which precipitate in solid steel are approximately 100 times less coarse and are not visible in the micrographic sections observed at a magnification of 5000.

Since the very small titanium nitrides precipitated in the solid state are very numerous and since the average distance between neighboring precipitates is very small, the inventors believe that the very small titanium nitrides slow down the progression of the interface between the ferritic phase and the austenitic phase during the bainitic transformation and thus act especially on the lamellar substructure which is then all the finer the closer together the very small precipitates, that is to say the more numerous they are.

This result is reproducible. Thus the steels according to the invention are titanium steels in which the number of titanium nitrides having a size greater than 0.1 $\mu$m does not exceed 4 times and, in general, does not exceed 3 times the total content of titanium precipitated in the form of nitrides, expressed in thousandths of %.

When these steels are treated in order to have a bainitic structure, their ductile/brittle transition temperature is then less than the transition temperature, by at least 30° C. and as rule approximately 60° C., of the same steels without titanium or in which the titanium precipitated in the liquid steel in the form of coarse nitrides having size greater than 0.1 $\mu$m, in a proportion such that, in a micrographic section, the number per mm$^2$ of TiN particles having a size greater than 0.1 $\mu$m is substantially greater than 4 times the total content of titanium precipitated in the form of nitrides, expressed in thousandths of %.

Also by way of example, steel D and steel G according to the invention and, by way of comparison, steels C, E and F according to the prior art were smelted. The compositions of these steels were as follows (in thousandths of % by weight):

|   | C | Si | Mn | Ni | Cr | Mo | Al | Ti | N$_2$ | S | P |
|---|---|---|---|---|---|---|---|---|---|---|---|
| C | 68 | 265 | 351 | 109 | 8300 | 950 | 25 | 0 | 11 | 1 | 18 |
| D | 71 | 250 | 363 | 150 | 8450 | 935 | 23 | 32 | 11.5 | 1 | 19 |
| E | 360 | 210 | 520 | 3950 | 1755 | 360 | 18 | 0 | 7.2 | 2 | 12 |
| F | 365 | 255 | 495 | 4030 | 1750 | 355 | 22 | 18 | 6.8 | 1 | 10 |
| G | 368 | 195 | 438 | 3940 | 1810 | 350 | 21 | 20 | 7 | 2 | 10 |

Furthermore, steels E, F and G contained vanadium, the contents of which (in thousandths of %) were:

E:=42; F;=38; G:=40

The steel specimens C and D were austenized at 950° C. and then cooled at 120°/hour down to room temperature, and had a bainito-martensitic structure with lower bainite dominating; the specimens of steel E, F and G were austenized at 850° C. and then cooled at 200°/hour down to room temperature, and had essentially bainitic structures. For steels D and G, the number of titanium nitride particles having a size greater than 0.1 $\mu$m, per square millimeter, were less than 4 times the total contents of titanium precipitated in the form of nitrides, expressed in thousandths of %, while for steels C, E and F this proportion was greater than 5.

The tensile strength and ductile/brittle transition temperatures of the bainitic structures were:

|   |   | Rm, MPa | Tc |
|---|---|---|---|
| C | prior art | 1050 | −10° C. |
| D | invention | 1055 | −65° C. |
| E | prior art | 1540 | +10° C. |
| F | prior art | 1535 | +15° C. |
| G | invention | 1545 | −35° C. |

In order to manufacture these steels, which must contain more than 0.005% of titanium and more than 0.003% of nitrogen and preferably between 0.010% and 0.10% of titanium, between 0.003% and 0.02% of nitrogen, the nitrogen and titanium contents being such that:

$$(N\%) \times (Ti\%) \leq 0.0016$$

in order to limit titanium nitride precipitation in the liquid steel, a liquid steel containing no titanium is smelted either by remelting scrap iron in an electric furnace or by refining cast iron in a converter, or by any other means. Then titanium is progressively diffused into the liquid steel from an oxidized phase containing titanium, the final composition of the steel is adjusted and the steel is cast in order to solidify it in, e.g., the form of a casting ingot, slag, thin strip, bloom billet or wire.

In order to diffuse the titanium from the oxidized phase containing titanium the steel must be deoxidized by an addition of an element more reducing than titanium, including any one or more elements selected from aluminum, calcium, cerium, zirconium, magnesium, lithium, thorium or beryllium.

By way of example, the liquid steel may be smelted in any known manner and poured while still oxidized, that is to say containing approximately 0.01% of dissolved oxygen, into a ladle, and then the bath of liquid steel may be covered with a slag which contains titanium or in which titanium in the form of an oxide powder or of a metallic powder is added.

Next the liquid steel is deoxidized by progressive addition of at least 0.02% of aluminum or zirconium, and then the liquid steel may be agitated either by blowing in an inert gas, such as argon, by electromagnetic agitation, or by any other means, in order to renew the contact surface between the liquid steel and the slag, and, finally, the liquid steel may be cast in order to solidify it after adjustment of the final composition.

The liquid steel may also be smelted in any known manner and poured in the non-deoxidized state into a ladle containing ferro-titanium where titanium oxides can form; when the titanium oxides have been formed, an element more reducing than titanium can be added so as to dissolve the titanium oxides, and then the steel may be cast in order to solidify it after adjustment of the final composition. In this embodiment, the titanium oxides have a tendency to settle and in order to improve the effectiveness of the addition of titanium before deoxidization, the ladle may be covered with a slag which absorbs some of the titanium oxides; the slag then becomes laden with titanium and this element passes progressively back into the liquid steel during the deoxidation.

The titanium may also be introduced by means of a cover powder used, for example, in continuous casting.

When the steel is melted, for example in a converter, its nitrogen content is generally much lower than when it is smelted in an electric furnace. It is then possible, after introducing the titanium, to increase the nitrogen content, for example by agitating the liquid steel with gaseous nitrogen or with a mixture of an inert gas such as argon and/or nitrogen.

By means of this process it is possible to manufacture steel components such as castings, forging, sheets, strips, bars, sections, beams, rails, wires or any other ferrometallurgical product whose chemical composition is in accordance with the invention and which, when it has a structure containing at least 30% of bainite obtained in a known manner by one skilled in the art, has a ductile/brittle transition temperature which is at least 30° C. lower, and typically 60° lower, than the transition temperature obtained on products of the same composition, and the same micrographic structure, but obtained by smelting steel according to the prior art.

It should be noted that occasionally steel according to the invention may furthermore optionally contain a little titanium precipitated in the form of oxides (i.e., 0.001–0.10 wt% of oxides).

This application is based on French patent 94 14 346 filed Nov. 30, 1994, incorporated herein by reference.

What is claimed as new and is desired to be secured by letters patent of the United States is:

1. A process for preparing steel containing more than 0.005% by weight of titanium and which has a structure at least 30% of which is bainite, comprising the steps of:
   (a) smelting a liquid steel containing more than 0.003% by weight of nitrogen and not containing titanium;
   (b) contacting the non-deoxidized liquid steel prepared in step (a) with an oxidized phase containing titanium;
   (c) deoxidizing the liquid steel by adding at least one element thereto which is more reducing than titanium;
   (d) optionally renewing the contact surface between the liquid steel and the oxidized phase containing titanium;
   (e) optionally adjusting the final composition of the steel; and
   (f) heat treating the steel so as to produce a steel which has a structure at least 30% of which is bainite.

2. The process as claimed in claim 1, wherein the oxidized phase containing titanium is a slag.

3. The process as claimed in claim 1, wherein the oxidized phase containing titanium is a cover powder.

4. The process as claimed in claim 1, wherein in order to renew the contact surface between the liquid steel and the oxidized phase containing titanium, the liquid steel is agitated.

5. A process for preparing steel having a structure at least 30% of which is bainite and containing more than 0.005% of titanium, comprising the steps of:
   (a) smelting a liquid steel containing more than 0.003% by weight of nitrogen and containing no titanium;
   (b) adding titanium to the non-deoxidized liquid steel obtained in step (a);
   (c) adding at least one element more reducing than titanium to the liquid steel obtained in step (b) and
   (d) heat treating the steel to produce a structure at least 30% of which is bainite.

6. The process as claimed in claim 5, wherein, before adding titanium to the non-deoxidized liquid steel, the liquid steel is covered with a slag.

7. The process as claimed in claim 1, wherein after introducing titanium into the steel, the nitrogen content of the steel is increased by agitation with gaseous nitrogen or with a mixture of nitrogen another inert gas.

8. The process as claimed in claim 5, wherein after introducing titanium into the steel, the nitrogen content of the steel is increased by agitation with gaseous nitrogen or with a mixture of nitrogen another inert gas.

9. A steel obtained by the process as claimed in claim 1, which is at least 30% bainite and contains, by weight, more than 0.005% of titanium and more than 0.003% of nitrogen, the titanium and nitrogen contents being such that:

$$(N\%) \times (Ti\%) \leq 0.0016$$

and wherein, in the solid state, the number of titanium nitride precipitates having a size greater than 0.1 $\mu$m, measured over an area of 1 mm$^2$ in a micrographic section, is less than 4 times the total content of titanium precipitated in the form of nitrides, expressed in thousandths of % by weight.

10. A steel obtained by the process as claimed in claim 5, which is at least 30% bainite and contains, by weight, more than 0.005% of titanium and more than 0.003% of nitrogen, the titanium and nitrogen contents being such that:

$$(N\%) \times (Ti\%) \leq 0.0016$$

and wherein, in the solid state, the number of titanium nitride precipitates having a size greater than 0.1 $\mu$m, measured over an area of 1 mm$^2$ in a micrographic section, is less than 4 times the total content of titanium precipitated in the form of nitrides, expressed in thousandths of % by weight.

11. A steel which is at least 30% banite and comprises, by weight, more than 0.005% of titanium and more than 0.003% of nitrogen, the titanium and nitrogen contents being such that:

$$(N\%) \times (Ti\%) \leq 0.0016$$

and wherein, in the solid state, the number of titanium nitride precipitates having a size greater than 0.1 $\mu$m, measured over an area of 1 mm$^2$ in a micrographic section, is less than 4 times the total content of titanium precipitated in the form of nitrides, expressed in thousandths of % by weight.

12. The steel as claimed in claim 10, in which the number of titanium nitride precipitates having a size greater than 0.1

μm, measured over an area of 1 mm² in a micrographic section, is less than 3 times the total content of the titanium precipitated in the form of nitrides, expressed in thousandths of % by weight.

13. The steel as claimed in claim 9, which steel contains more than 0.01% by weight total aluminum and zirconium, but less than 0.5% of aluminum and less than 0.5% of zirconium.

14. The steel as claimed in claim 10, which steel contains more than 0.01% by weight total aluminum and zirconium, but less than 0.5% of aluminum and less than 0.5% of zirconium.

15. The steel as claimed in claim 9, the chemical composition of which, by weight, satisfies the relationships:

$$0.003\% \leq N \leq 0.02\%$$
$$0.010\% \leq Ti \leq 0.1\%$$
$$(N\%) \times (Ti\%) \leq 0.0016.$$

16. The steel as claimed in claim 10, the chemical composition of which, by weight, satisfies the relationships:

$$0.003\% \leq N \leq 0.2\%$$
$$0.010\% \leq Ti \leq 0.1\%$$
$$(N\%) \times (Ti\%) \leq 0.0016.$$

17. The steel as claimed in claim 9, the chemical composition of which, by weight, comprises:

$$0.04\% \leq C \leq 0.80\%$$
$$0\% \leq Si \leq 2\%$$
$$0\% \leq Mn \leq 3\%$$
$$0\% \leq Ni \leq 10\%$$
$$0\% \leq Cr \leq 10\%$$
$$0\% \leq Mo \leq 3\%$$
$$0\% \leq Cu \leq 2\%$$
$$0\% \leq V \leq 1\%$$
$$0\% \leq Nb \leq 0.5\%$$
$$0\% \leq W \leq 3\%$$
$$0\% \leq S \leq 0.2\%$$
$$P \leq 0.03\%$$

and optionally at least one element taken from: Ca, Mg, Se, Te, Bi and B in amounts less than 0.1% by weight, the balance being iron and impurities resulting from the smelting.

18. The steel as claimed in claim 10, the chemical composition of which, by weight, comprises:

$$0.04\% \leq C \leq 0.80\%$$
$$0\% \leq Si \leq 2\%$$
$$0\% \leq Mn \leq 3\%$$
$$0\% \leq Ni \leq 10\%$$
$$0\% \leq Cr \leq 10\%$$
$$0\% \leq Mo \leq 3\%$$
$$0\% \leq Cu \leq 2\%$$
$$0\% \leq V \leq 1\%$$
$$0\% \leq Nb \leq 0.5\%$$
$$0\% \leq W \leq 3\%$$
$$0\% \leq S \leq 0.2\%$$
$$P \leq 0.03\%$$

and optionally at least one element taken from: Ca, Mg, Se, Te, Bi and B in amounts less than 0.1% by weight, the balance being iron and impurities resulting from the smelting.

19. The process of claim 1, wherein said steel has a structure at least 60% of which is bainite and wherein in step (f) the steel is solidified so as to produce a steel which has a structure at least 60% of which is bainite.

20. The process of claim 5, wherein said steel has a structure at least 60% of which is bainite and wherein in step (d) said steel is solidified to produce a structure at least 60% of which is bainite.

21. The steel of claim 9, wherein said steel is at least 60% bainite.

22. The steel of claim 10, wherein said steel is at least 60% bainite.

23. The steel of claim 11, wherein said steel is at least 60% bainite.

24. The process of claim 1, wherein said steel has a structure which is completely bainite and wherein in step (f) said steel is solidified so as to produce a steel which has a completely bainitic structure.

25. The process of claim 5, wherein said steel has a completely bainitic structure and wherein in step (d) said steel is solidified so as to produce a completely bainitic structure.

26. The steel of claim 9, wherein said steel has a completely bainitic structure.

27. The steel of claim 10, wherein said steel has a completely bainitic structure.

28. The steel of claim 11, wherein said steel has a completely bainitic structure.

* * * * *